United States Patent
Kobayashi et al.

(10) Patent No.: US 6,229,689 B1
(45) Date of Patent: *May 8, 2001

(54) SOLID ELECTROLYTE CAPACITOR AND METHOD FOR MANUFACTURING THE SAME

(75) Inventors: Atsushi Kobayashi; Takashi Fukaumi; Tomohide Date, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,594

(22) Filed: Jul. 16, 1997

(30) Foreign Application Priority Data

Jul. 16, 1996 (JP) ........................................ 8-185831

(51) Int. Cl.⁷ .................................................. H01G 9/028
(52) U.S. Cl. .................. 361/525; 361/524; 361/528; 361/532; 361/535; 252/62.2
(58) Field of Search ............................. 361/500, 523, 361/525, 528, 532, 535; 252/62.2; 29/25.03

(56) References Cited

U.S. PATENT DOCUMENTS

| | | | |
|---|---|---|---|
| 4,858,078 | * 8/1989 | Morimoto et al. | 361/525 |
| 4,910,645 | * 3/1990 | Jonas et al. | 361/525 |
| 5,187,650 | 2/1993 | Kudoh et al. | 361/525 |
| 5,223,353 | 6/1993 | Ohsawa et al. | 429/192 |
| 5,254,633 | 10/1993 | Han et al. | 525/327.4 |
| 5,436,796 | 7/1995 | Abe et al. | 361/525 |
| 5,457,862 | 10/1995 | Sakata et al. | 29/25.03 |
| 5,473,503 | 12/1995 | Sakata et al. | 361/525 |
| 5,586,001 | * 12/1996 | Amano et al. | 361/523 |
| 5,621,608 | * 4/1997 | Arai et al. | 361/521 |
| 5,729,428 | 3/1998 | Sakata et al. | 361/523 |
| 5,795,953 | 8/1998 | Kim et al. | 528/423 |
| 5,843,741 | 12/1998 | Wong et al. | 435/173.8 |
| 5,914,852 | 6/1999 | Hatanaka et al. | |

FOREIGN PATENT DOCUMENTS

| | | |
|---|---|---|
| 0 697 705 | 2/1996 | (EP) . |
| 0 716 424 | 6/1996 | (EP) . |
| 1-170010 | 7/1989 | (JP) . |
| 3-291909 | 12/1991 | (JP) . |
| 7-70312 | 3/1995 | (JP) . |
| 8-045790 | 2/1996 | (JP) . |
| 9-293639 | 11/1997 | (JP) . |

OTHER PUBLICATIONS

Hitoshi et al., "Conductive Polymer, its Solution, Solid Electrolytic Capacitors, and its Production", Abstracts of Japan, (publication No. 07070312), Mar. 1995.*
Chemistry Letters, No. 4, pp 253–254 (Apr. 1996).

* cited by examiner

*Primary Examiner*—Kristine Kincaid
*Assistant Examiner*—Eric Thomas
(74) *Attorney, Agent, or Firm*—Sughrue, Mion, Zinn, Macpeak & Seas, PLLC (57) ABSTRACT

A solid electrolyte capacitor having a solid electrolyte layer that is formed of a polymeric product layer of a polymerizable monomer. The polymeric product layer is doped with an organic sulfonic acid selected from the group consisting of an aromatic polysulfonic acid, an organic sulfonic acid having a hydroxy group, an organic sulfonic acid having a carboxyl group, an alicyclic sulfonic acid, and a benzoquinone sulfonic acid.

10 Claims, 4 Drawing Sheets

Fig. 1

| CAPACITOR | DOPANT | POLYMER | OXIDIZING AGENT |
|---|---|---|---|
| EMBODIMENT 1 | BENZENEDISULFONIC ACID | POLY (3, 4-ETHYLENDIOXY-THIOPHENE) | IRON (III) BENZENEDISULFONATE |
| EMBODIMENT 2 | SULFOSALICYLIC ACID | POLY (3, 4-ETHYLENDIOXY-THIOPHENE) | IRON (III) SULFOSALICYLATE |
| EMBODIMENT 3 | SULFOISOPHTHALIC ACID | POLY (3, 4-ETHYLENDIOXY-THIOPHENE) | IRON (III) SULFOISOPHTHALIATE |
| EMBODIMENT 4 | CAMPHORSULFONIC ACID | POLY (3, 4-ETHYLENDIOXY-THIOPHENE) | IRON (III) CAMPHORSULFONATE |
| EMBODIMENT 5 | BENZOQUINONE SULFONIC ACID | POLY (3, 4-ETHYLENDIOXY-THIOPHENE) | IRON (III) BENZOQUINONE SULFONATE |
| EMBODIMENT 6 FIRST LAYER | BENZENEDISULFONIC ACID | POLYPYRROLE | IRON (III) BENZENEDISULFONATE |
| SECOND LAYER | BENZENEDISULFONIC ACID | POLY (3, 4-ETHYLENDIOXY-THIOPHENE) | IRON (III) BENZENEDISULFONATE |
| EMBODIMENT 7 | DODECYLBENZENSULFONIC ACID | POLY (3, 4-ETHYLENDIOXY-THIOPHENE) | COPPER (II) DODECYLBENZENSULFONATE |
| EMBODIMENT 8 | TOLUENSULFONIC ACID | POLY (3, 4-ETHYLENDIOXY-THIOPHENE) | SILVER (II) OXIDE |
| EMBODIMENT 9 | TOLUENSULFONIC ACID | POLY (3, 4-ETHYLENDIOXY-THIOPHENE) | MIXTURE OF IRON NITRATE / HYDROGEN PEROXIDE WATER |
| COMPARATIVE EXAMPLE 1 | TOLUENSULFONIC ACID | POLY (3, 4-ETHYLENDIOXY-THIOPHENE) | IRON (III) TOLUENSULFONATE |
| COMPARATIVE EXAMPLE 2 | BENZENEDISULFONIC ACID | POLYPYRROLE | IRON (III) BENZENEDISULFONATE |
| COMPARATIVE EXAMPLE 3 | DODECYLBENZENSULFONIC ACID | POLY (3, 4-ETHYLENDIOXY-THIOPHENE) | IRON (III) DODECYLBENZENSULFONATE |

SOLID ELECTROLYTE CAPACITOR AND METHOD FOR MANUFACTURING THE SAME

BACKGROUND OF THE INVENTION

1. Field of the Invention

The present invention relates to a solid electrolyte capacitor and a method for manufacturing the same, and more specifically to a solid electrolyte capacitor comprising a solid electrolyte formed of a conducting polymer material and a method for manufacturing the same.

2. Description of Related Art

A solid electrolyte capacitor has such a construction that an anode is formed of a porous shaped member of a valve metal such as a tantalum or aluminum, a dielectric material layer constituted of a metal oxide film formed on a surface of the anode, and a cathode having its portion formed of a solid electrolyte layer formed on the metal oxide film. Since the solid electrolyte layer has a function of electrically connecting between the whole surface of the dielectric material formed on an inner surface of pores in the porous shaped member and an external cathode terminal for connecting with an external device, the solid electrolyte layer is preferably formed of a material having a high conductivity. In addition, the solid electrolyte layer is also required to have a function of healing an electric short-circuiting attributable to a defect in the dielectric film. As a result, a metal having a high conductivity but having no function of healing the dielectric film cannot be used as the solid electrolyte, and manganese dioxide has been used which is converted into an insulator because of heat generated by a short-circuiting current.

Furthermore, when the solid electrolyte capacitor is mounted together with other circuit components on a mounting board such as a printed circuit board, the solid electrolyte capacitor is exposed to a heat as high as 240° C. to 260° C. although the heat is temporary. In view of this problem, since the manganese dioxide has a satisfactory resistance to heat of not less than 240° C., the manganese dioxide has been widely used.

As seen from the above, the material used as the solid electrolyte of the solid electrolyte capacitor are required to fulfill three conditions: (1) high electric conductivity; (2) the function of healing the dielectric material; and (3) resistance to heat of not less than 240° C.

Here, the manganese dioxide widely used in the prior art as the solid electrolyte has a satisfactory characteristics in connection with the function of healing the dielectric material and the resistance to a high heat at the time of mounting. However, the conductivity of about 0.1 S/cm of the manganese dioxide cannot be necessarily said to be satisfactory as the solid electrolyte of the solid electrolyte capacitor. Under this circumstance, recently, there is energetically advanced the development of a solid electrolyte capacitor comprising a solid electrolyte formed of conducting polymer material such as polypyrrole, polythiophene, polyaniline, which has electric conductivity as high as 10 S/cm to 100 S/cm and which fulfills the three conditions required for the solid electrolyte of the solid electrolyte capacitor.

In general, the solid electrolyte capacitor utilizing the above mentioned conducting polymer material has some problems, which will be described hereinafter. First, it is necessary to form a conducting polymer layer on an inner surface of the porous shaped member without leaving a surface portion which is not covered with the conducting polymer material. Secondly, the conducting polymer material must have a satisfactory resistance to a heat of less than 240° C. at the time of mounting. Thirdly, the conducting polymer material never lowers the electric conductivity at a high temperature which is different from the temporary high heat of less than 240° C. exposed when the capacitor is mounted onto the printed circuit board, and which continues for a relative long time and reaches a relatively high temperature on the degree of 120° C. to 150° C. under an actual working environment in which a circuit having the mounted capacitor is in operation. Fourthly, the conducting polymer layer must be formed to have a film thickness of less than a predetermined value in a good film quality, so that the underlying dielectric oxide film is in no way damaged by a stress generated in a thermal expansion and shrinkage of a housing resin member (thermal stress).

Of the above mentioned four conditions, the second condition, namely, the resistance to heat at the time of mounting is a nature inherent to the polymer, determined by a chemical bonding condition of the conducting polymer. On the other hand, the third condition, namely, the resistance to temperature in the actual working environment is determined by the degree of so a called "de-doping" in which dopants giving electric conductivity to polymer are lost from the polymer. Since these second and third conditions are different from each other in a determining factor, the resistance to a high heat at the time of mounting, directed to the second condition, will be called a "resistance to high heat" hereinafter, and the resistance to a high temperature in the actual working environment will be called a "resistance to high temperature" hereinafter.

In the above mentioned problems of the solid electrolyte capacitor, Japanese Patent Application Pre-examination Publication No. JP-A-02-015611 and its corresponding U.S. Pat. No. 4,910,645 (the content of which is incorporated by reference in its entirety into this application) proposes a solid electrolyte capacitor comprising an electrolyte layer formed of polythiophene derivative which obtains electric conductivity by doping p-toluenesulfonic acid or methanesulfonic acid. In this patent, for forming a layer of polythiophene derivative, an iron (III) compound (ferric compound) is used so that polythiophene derivative monomer is oxidatively polymerized by oxidative reaction from iron (III) (ferric ion) to iron (II) (ferrous ion).

The polythiophene derivative used in the electrolyte capacitor disclosed in the above referred patent has the "resistance to high heat" higher than other polymer such as polypyrrole derivative, namely, is more excellent in the second condition ("resistance to high heat") of the above mentioned four conditions. In addition, as regards the film quality, polypyrrole is in the form of powder, and therefore, poor in denseness, and to the contrary, the polythiophene derivative forms a film. In addition, the film quality of the polythiophene derivative is the most dense as compared with other polymer including polyaniline, other than polypyrrole. Therefore, the electrolyte capacitor comprising the solid electrolyte formed of polythiophene derivative can sufficiently resist to a stress generated in a thermal expansion and shrinkage of a housing resin member (thermal stress). In addition, since the polymer layer is dense, the film thickness required to have a necessary degree of "resistance to thermal stress" can be made small. In other words, since the electric resistance of the solid electrolyte layer can be made smaller than the case that other conducting polymer materials are used, a high frequency characteristics of the capacitor can be elevated.

As seen from the above, the solid electrolyte capacitor disclosed in the above referred patent is excellent in the "resistance to high heat" of the second condition and in the "resistance to thermal stress" in the fourth condition, of the four conditions required for this type of capacitor.

Recently, however, electronic instruments are rapidly increasing its field of application with advancement in performance of electronic instruments and in compactness and light weight of electronic instruments. Under this inclination, electric parts incorporated in an electronic circuit are strongly required to have an elevated performance including an improved characteristics and an elevated reliability (degree of resistance to deterioration in performance caused by an irreversible change with lapse of time under a constant condition), although working environment and condition have a tendency to degrade. For the solid electrolyte capacitor, it is strongly required to elevate the "resistance to high temperature" (namely, to prevent deterioration of the electric resistance of the conducting polymer material in use under a high temperature) and also to elevate the "resistance to thermal stress". Furthermore, the solid electrolyte capacitor having an excellent characteristics and high reliability should be preferably inexpensive, and therefore, is preferred to be manufactured in accordance with a process, which is high in efficiency of chemical oxidative polymerization at the time of forming the conducting polymer layer, and which can shorten the manufacturing process and can reduce the amount of raw material used.

SUMMARY OF THE INVENTION

Accordingly, it is a first object of the present invention to provide a solid electrolyte capacitor comprising a solid electrolyte formed of a conducting polymer layer having a high "resistance to high temperature".

A second object of the present invention is to provide a solid electrolyte capacitor comprising a solid electrolyte formed of a conducting polymer layer having a high "resistance to thermal stress".

A third object of the present invention is to provide a method for manufacturing a solid electrolyte capacitor, capable of elevating the efficiency of polymerization at the time of forming the conducting polymer layer.

The above and other objects of the present invention are achieved in accordance with the present invention by a solid electrolyte capacitor comprising a solid electrolyte layer formed of a polymeric product layer of a polymerizable monomer, the polymeric product layer being doped with organic sulfonic acid selected from the group consisting of aromatic polysulfonic acid, organic sulfonic acid having hydroxy group, organic sulfonic acid having carboxyl group, alicyclic sulfonic acid and benzoquinone sulfonic acid.

According to another aspect of the present invention, there is provided to a method for manufacturing a solid electrolyte capacitor, including the step of forming a polymeric product layer as a solid electrolyte layer by chemically oxidative-polymerizing a polymerizable monomer, the chemical oxidative polymerization being carried out by using, as an oxidizing agent, a material selected from the group consisting of copper (II) compound (curpic compound), silver compound, mixture of copper (II) compound and silver compound, and mixture of iron compound and hydrogen peroxide water.

The above listed organic sulfonic acids used in the present invention as the dopant giving electric conductivity to the polymer, have a three-dimensional molecular structure larger than that of other sulfonic acids such as a conventionally well-known dodecylbenzensulfonic acid and p-toluenesulfonic acid and methane-sulfonic acid which are disclosed in the above referred patent. Namely, the above listed organic sulfonic acids are large in molecular size.

Here, under a high temperature working environment, the lowering of the electric conductivity of the conducting polymer material is attributable to the "de-doping" in which dopants giving electric conductivity to polymer are lost from the polymer. If the molecular size of the dopants is large, purging of the dopants caused by thermal vibration of polymer is restricted or prevented because of interaction between the dopants and the polymer chain. Namely, the dopants become difficult to escape from the polymer, and therefore, the "de-doping" becomes difficult to occur, with the result that electric conductivity is hard to drop. Namely, the first object of the present invention is achieved.

The aromatic polysulfonic acid, used as the dopants in the present invention, is not particularly limited if it is aromatic compound including a plurality of sulfonic groups in its molecular structure. For example, benzenedisulfonic acid and naphthalene disulfonic acid can be used.

The organic sulfonic acid having hydroxy group is not particularly limited if it is sulfonic acid including a hydroxy group in its molecular structure. For example, sulfoisophthalic acid and phenolsulfonic acid can be used.

The organic sulfonic acid having carboxyl group is not particularly limited if it is sulfonic acid including a carboxyl group in its molecular structure. For example, sulfosalicylic acid and sulfobenzoic acid can be used.

The alicyclic sulfonic acid is not particularly limited if it is sulfonic acid having an alicyclic molecular structure. For example, camphorsulfonic acid and adamantane sulfonic acid can be used.

In the present invention, the solid electrolyte composed of conducting polymer is formed of polythiophene derivative if the solid electrolyte is constituted of a single layer. If the solid electrolyte is constituted of a plurality of layers, at least the uppermost layer is formed of polythiophene derivative. As mentioned hereinbefore, the polythiophene derivative has a very dense film quality in the form of a film. Therefore, even if the polythiophene derivative is formed to have a film thickness enough to protect an extremely thin oxide film (constituting the dielectric layer of the capacitor) from a stress caused by a thermal expansion and shrinkage of the housing resin member, the polythiophene derivative film can maintain a low "equivalent series resistance (ESR)". Namely, the second object of the present invention is achieved. In this case, the plurality of layers constituting the solid electrolyte layer, other than the uppermost layer, can be formed of a polymer or copolymer of at least one monomer selected from the group consisting of pyrrole, thiophene, furan, aniline and their derivatives.

As mentioned above, in the manufacturing method of the present invention, copper (II) compound (curpic compound) and silver compound are used as the oxidizing agent in the process for forming the conducting polymer layer. As compared with the iron (III) compound (ferric compound) used in the patent referred to hereinbefore, the copper (II) compound and the silver compound can reduce generation of so called by-product other than a target polymer, and therefore, can elevate polymerization efficiency. On the other hand, if the mixture of iron compound and hydrogen peroxide water is used as the oxidizing agent, the by-product becomes liquid, and therefore, generation of a solid by-product becomes zero. Therefore, a reaction efficiency is also high. Namely, the third object of the present invention is achieved.

The copper (II) compound (curpic compound) used as the oxidizing agent in the present invention is not particularly limited. For example, copper (II) chloride (cupric chloride), copper (II) methylsulfonate, copper (II) toluensulfonate, copper (II) benzenesulfonate, and copper (II) benzenedisulfonate can be used.

Also, the silver compound used as the oxidizing agent in the present invention is not particularly limited. For example, silver oxide and silver fluoride can be used. The iron compound is also not particularly limited. For example, pure iron such as iron powder and iron plate, and iron nitrate, iron hydroxide and iron chloride can be used.

In the method in accordance with the present invention for manufacturing the solid electrolyte capacitor, the chemical oxidative polymerization for forming the conducting polymer layer is not particularly limited. For example, it is possible to use a method of introducing a solution of a mixture of a monomer and an oxidizing agent cooled down at a temperature lower than a reaction starting temperature, into a porous shaped member of a valve metal which has been formed with an oxide film, and thereafter, of exposing to atmosphere of not less than the reaction starting temperature. Alternatively, it is also possible to spray and dry the solution of a mixture of monomer for conducting polymer and the oxidizing agent. Furthermore, the oxidizing agent is introduced, as it is or after it is dissolved into a suitable solvent, into a porous shaped member of a valve metal which has been formed with an oxide film, and thereafter, the porous shaped member is exposed to monomer itself or monomer solution or vaporized monomer gas for conducting polymer. Alternatively, monomer for conducting polymer is introduced into a porous shaped member of a valve metal, and then, is exposed to the oxidizing agent.

The above and other objects, features and advantages of the present invention will be apparent from the following description of preferred embodiments of the invention with reference to the accompanying drawings.

DESCRIPTION OF THE PREFERRED EMBODIMENTS

Figure 1:
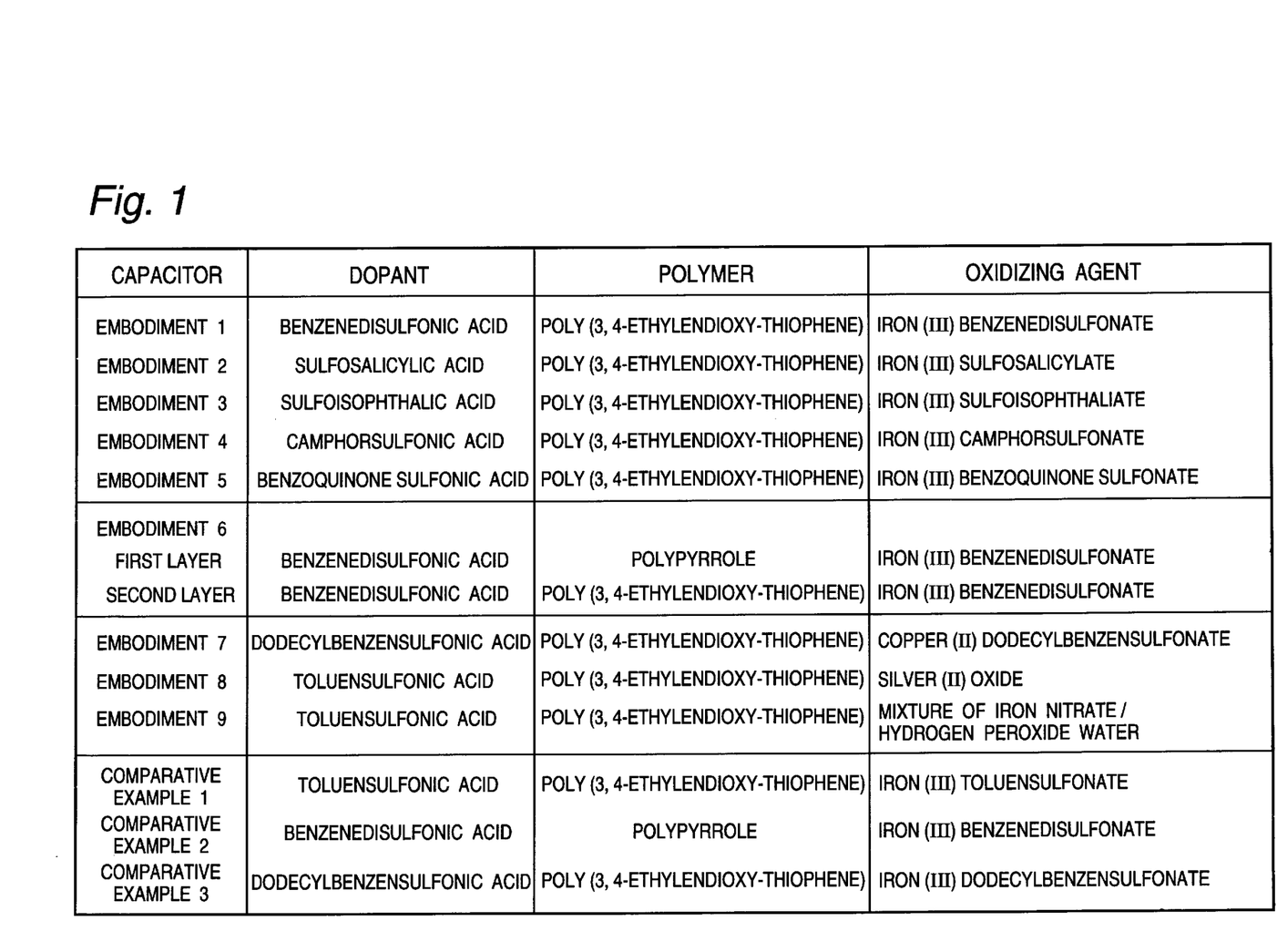
FIG. 1 is a table showing the structure of the conducting polymer layer in embodiments of the solid electrolyte capacitor in accordance with the present invention and comparative examples of the solid electrolyte capacitor.

Referring to FIG. 1, there is shown a table showing the structure of the conducting polymer layer in embodiments of the solid electrolyte capacitor in accordance with the present invention and comparative examples of the solid electrolyte capacitor. Chip type tantalum solid electrolyte capacitors of various embodiments each having a solid electrolyte layer formed of a combination of the oxidizing agent, the dopant and the polymer shown in the table of FIG. 1 were manufactured, and for comparison, some number of comparative examples of chip type tantalum solid electrolyte capacitors each having a solid electrolyte layer formed of a combination of the oxidizing agent, the dopant and the polymer shown in the table of FIG. 1 were manufactured. In addition, the "resistance to high temperature" and the "resistance to thermal stress" of the capacitors, and the polymerization efficiency at the time of forming the conducting polymer were compared between the embodiments and the comparative examples.

Figure 2A:
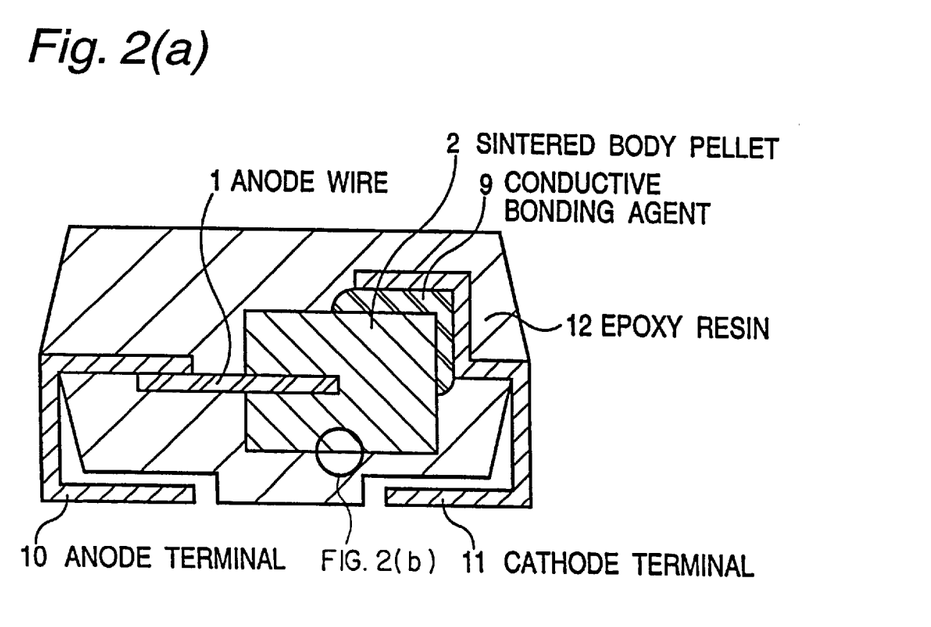
FIGS. 2(a) and 2(b) are diagrammatic sectional views the tantalum solid electrolyte capacitor in the Embodiments 1 to 5 and 7 to 9 and the Comparative examples 1 to 3.
Figure 2B:
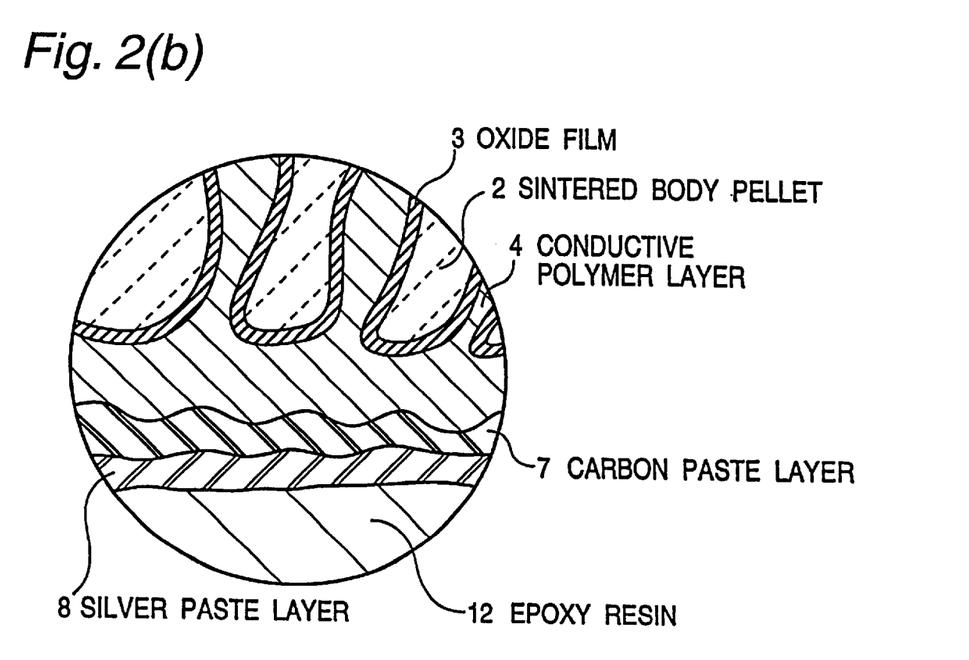
Figure 3A:
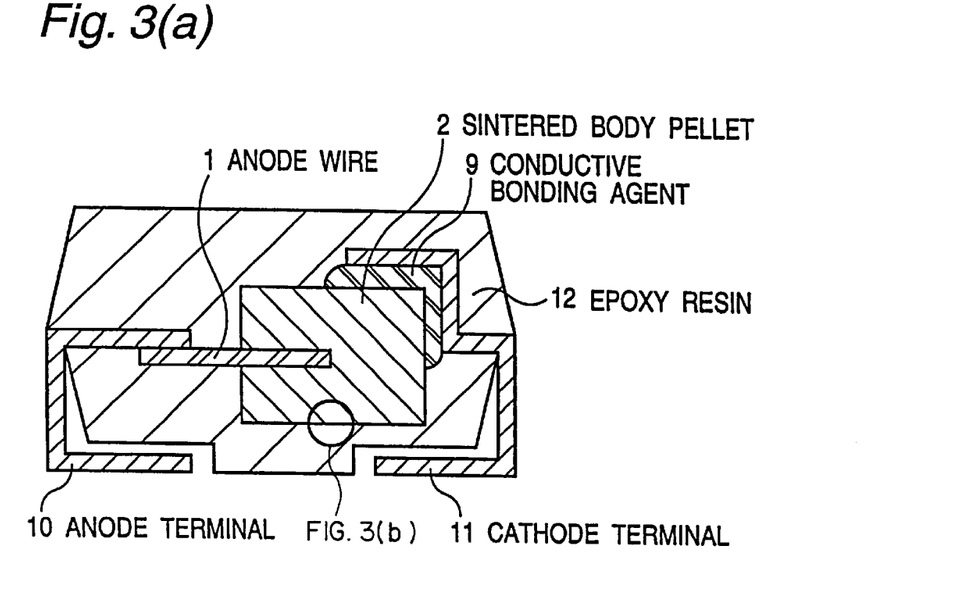
FIGS. 3(a) and 3(b) are diagrammatic sectional views of the tantalum solid electrolyte capacitor in the Embodiment 6.
Figure 3B:
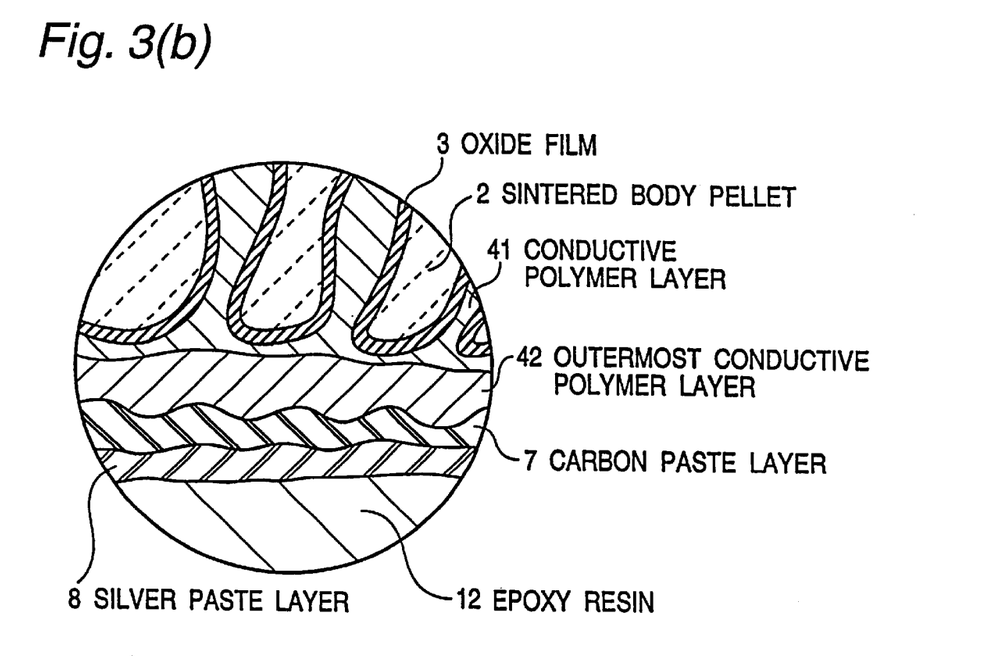

The manufactured capacitors are shown in FIGS. 2(a) and 3(a) are diagrammatic sectional views of the chip type tantalum solid electrolyte capacitor having the conducting polymer layer of a single-layer structure, and FIGS. 3(a) and 3(b) are diagrammatic sectional views of the chip type tantalum solid electrolyte capacitor having the conducting polymer layer of a double-layer structure. These capacitors of the embodiments and the comparative examples were manufactured in accordance with the process shown in the flowchart of FIG. 4.

In brief, the capacitor shown in FIG. 2(a) comprises a pellet 2 constituted of a sintered body of a valve metal, for example, in the form of a circular column. This sintered body pellet 2 has a considerably high porosity or void content. A base end portion of an anode wire 1 is inserted into and fixed to the pellet 2 to be electrically connected with the metal of the pellet 2. The pellet 2 can be formed by etching a foil of the valve metal and rolling it into a circular column.

As shown in FIG. 2(b), a surface of pores in the sintered body pellet 2 is coated with an oxide film 3, which constitutes a dielectric material of the capacitor. The pores in the sintered body pellet 2 are filled with a conducting polymer material 4. An outer surface of the conducting polymer material 4 is covered with a carbon paste layer 7, which is also covered with a silver paste layer 8. Thus, a solid electrolyte capacitor element is completed.

Furthermore, an outer end of the anode wire 1 is welded to an anode terminal 10, which is a connection terminal with an external circuit. On the other hand, a base end portion of a cathode terminal 11, which is also a connection terminal with an external circuit, is fixed to the silver paste layer 8 by a conductive bonding agent 9, so that the conducting polymer material 4 is electrically connected to the cathode terminal 11. The assembly thus formed is encapsulated and housed with an epoxy resin 12. More specifically, the capacitor element, the anode wire 1, the base end portion of the anode terminal 11, the conductive bonding agent 9 and the base end portion of a cathode terminal 11 are completely encapsulated within a body of the epoxy resin 12.

In FIGS. 3(a) and 3(b), elements corresponding to those shown in FIGS. 2(a) and 2(b) are given the same Reference Numerals, and explanation thereof will be omitted for simplification of description. As seen from comparison between FIGS. 2(b) and 3(b), the capacitor shown in FIG. 3(b) is characterized in that the layer of conducting polymer material 4 is formed of an inner conducting polymer layer 41 which completely fills the pores of the sintered body pellet 2, and an outermost conducting polymer layer 42 formed to completely cover the inner conducting polymer layer 41. The carbon paste layer 7 is formed to cover the outermost conducting polymer layer 41.

Embodiment 1

Figure 4:
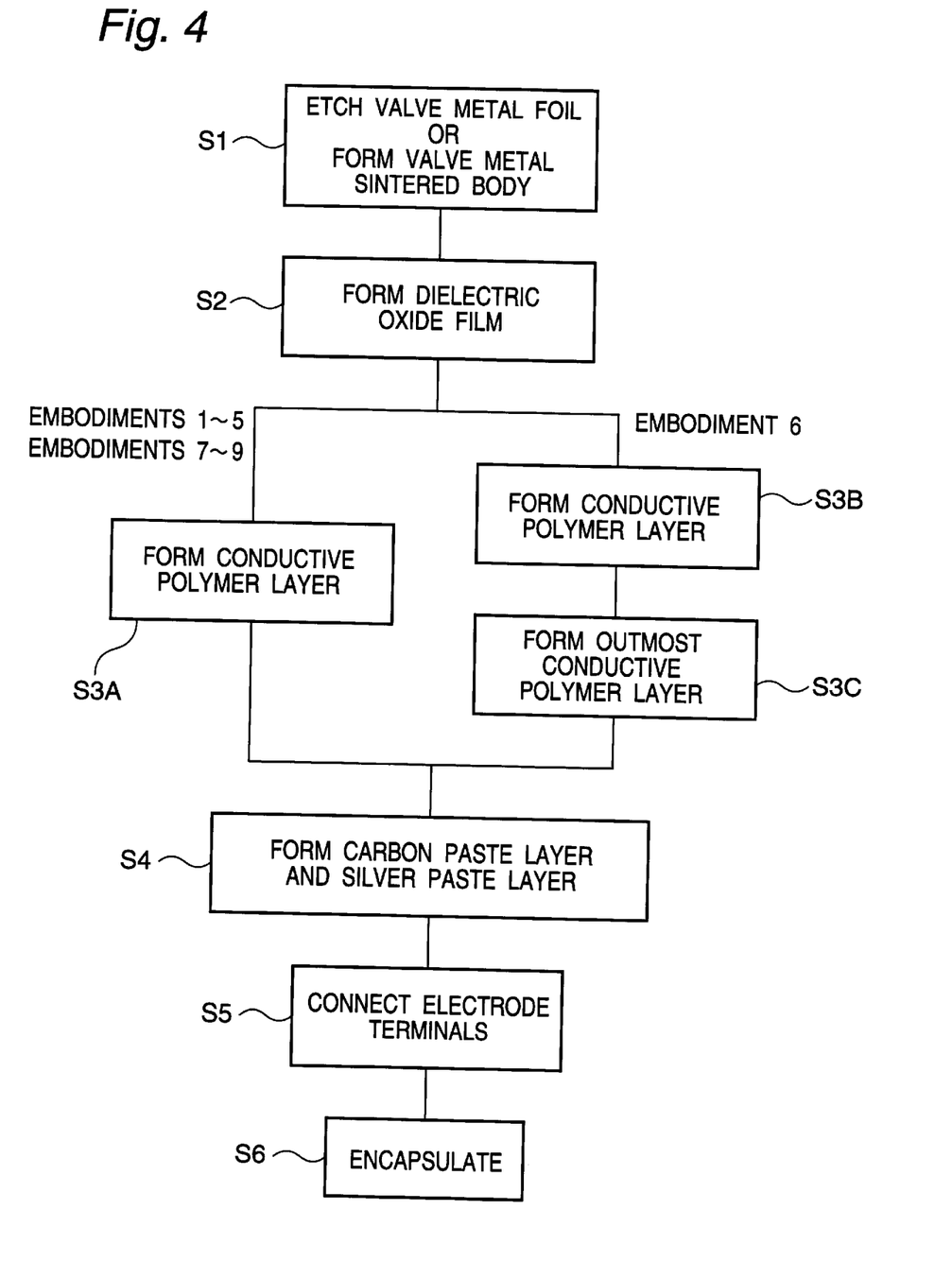
FIG. 4 is a flowchart illustrating a process for manufacturing the tantalum solid electrolyte capacitor in the embodiments and the comparative example.

A pellet 2 constituted of a tantalum sintered body in the form of a circular column having a length of 1 mm and a diameter of 1 mm (porosity or void content of about 70%) was prepared (step S1 in FIG. 4). The pellet 2 was anode-oxidized with 20 V in a 0.05% nitric acid solution, so that a film 3 of tantalum oxide ($Ta_2O_5$) is formed on a whole surface of the tantalum sintered body including an inner surface of pores of the sintered body, as shown in the circled enlarged partial view of FIG. 2 (step S2 in FIG. 4). The tantalum oxide film 3 constitutes a dielectric material of the capacitor. An electrostatic capacitance of the pellet 2 thus formed to have the tantalum oxide film was measured in a nitric acid solution. The capacitance was 10.5 $\mu$F (120 Hz).

The pellet 2 was immersed into a methanol solution of 4% 3,4-ethylendioxy-thiophene/12% iron (III) benzenedisulfonate, cooled at the temperature of 0° C. Then, the pellet 2 was taken out from the solution and was left at room temperature for 30 minutes. Thereafter, the pellet 2 was washed by methanol for 15 minutes, and then, dried at a temperature of 150° C. for 30 minutes. Thus, a layer of poly(3,4-ethylendioxy-thiophene) was formed. This operation of the immersing to the drying was repeated ten times, so that a conducting polymer layer 4 composed of poly(3,4-ethylendioxy-thiophene) doped with benzene-disulfonic acid was formed as shown in FIG. 2 (step S3A in FIG. 4).

Thereafter, a carbon paste layer 7 and a silver paste layer 8 were formed as shown in the circled enlarged partial view of FIG. 2, so that a capacitor element was completed (step S4 in FIG. 4). Furthermore, an anode wire 1 extending from the capacitor element was welded to an anode terminal 10, which is a connection terminal with an external circuit, and a cathode terminal 11, which is also a connection terminal with an external circuit, was fixed to the silver paste layer 8 (at a cathode side) by a conductive bonding agent 9 (step S5 in FIG. 4). Then, the assembly thus formed was encapsulated and housed with an epoxy resin 12 (step S6 in FIG. 4). Thus, the chip type tantalum solid electrolyte capacitor of this Embodiment 1 was finished.

Embodiment 2

A pellet 2 formed with the tantalum oxide film 3 similarly to Embodiment 1 was immersed into a methanol solution of 10% iron (III) sulfosalicylate at room temperature. Then, the pellet 2 was taken out from the solution, and it was left at room temperature for 30 minutes. Thereafter, the pellet 2 was immersed into 3,4-ethylendioxy-thiophene solution. The pellet 2 was taken out from the solution, and it was left at room temperature for 30 minutes. Then, the pellet 2 was washed by methanol for 15 minutes, and then, dried at a temperature of 150° C. for 30 minutes. Thus, a layer of poly(3,4-ethylendioxy-thiophene) was formed. This operation of the first immersing to the drying was repeated ten times, so that a conducting polymer layer 4 composed of poly(3,4-ethylendioxy-thiophene) doped with sulfosalicylic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 2 was finished.

Embodiment 3

A pellet 2 formed with the tantalum oxide film 3 similarly to Embodiment 1 was immersed into a methanol solution of 2% 3,4-ethylendioxy-thiophene/12% iron (III) sulfoisophthalate, cooled down at the temperature of 0° C. Thereafter, the pellet 2 was taken out from the solution, and it was left at room temperature for 30 minutes. Then, the pellet 2 was washed by methanol for 15 minutes, and then, dried at a temperature of 150° C. for 30 minutes. Thus, a layer of poly(3,4-ethylendioxy-thiophene) was formed. This operation of the immersing to the drying was repeated ten times, so that a conducting polymer layer 4 composed of poly(3,4-ethylendioxy-thiophene) doped with sulfosalicylic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 3 was finished.

Embodiment 4

A pellet 2 formed with the tantalum oxide film 3 similarly to Embodiment 1 was immersed into a methanol solution of 5% iron (III) camphorsulfonate at room temperature. Then, the pellet 2 was taken out from the solution, and it was left at room temperature for 30 minutes. Thereafter, the pellet 2 was immersed into 3,4-ethylendioxy-thiophene solution, and furthermore, was taken out from the solution and left at room temperature for 30 minutes. Then, the pellet 2 was washed by methanol for 15 minutes, and further, dried at a temperature of 150° C. for 30 minutes. Thus, a layer of poly(3,4-ethylendioxy-thiophene) was formed. This operation of the first immersing to the drying was repeated ten times, so that a conducting polymer layer 4 composed of poly(3,4-ethylendioxy-thiophene) doped with camphorsulfonic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 4 was finished.

Embodiment 5

A pellet 2 formed with the tantalum oxide film 3 similarly to Embodiment 1 was immersed into a methanol solution of 2% 3,4-ethylendioxy-thiophene/8% iron (III) benzoquinone sulfonate, cooled down at the temperature of 0° C. Then, the pellet 2 was taken out from the solution, and it was left at room temperature for 30 minutes. Thereafter, the pellet 2 was washed by methanol for 15 minutes, and then, dried at a temperature of 150° C. for 30 minutes. Thus, a layer of poly(3,4-ethylendioxy-thiophene) was formed. This operation of the immersing to the drying was repeated ten times, so that a conducting polymer layer 4 composed of poly(3,4-ethylendioxy-thiophene) doped with benzoquinone sulfonic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 5 was finished.

Embodiment 6

A pellet 2 formed with the tantalum oxide film 3 similarly to Embodiment 1 was immersed into a methanol solution of 50% iron (III) benzenedisulfonate. Then, the pellet 2 was taken out from the solution, and it was left at room temperature for 30 minutes. Thereafter, the pellet 2 was immersed in a pyrrole solution, and the pellet 2 was taken out from the solution, and it was left at room temperature for 30 minutes. The pellet 2 was washed by methanol for 5 minutes, and then, left at room temperature for 30 minutes.

Thus, a layer of polypyrrole was formed. This operation of the first immersing to the drying was repeated eight times, so that, as shown in FIG. 3, a first conducting polymer layer 41 composed of polypyrrole doped with benzenedisulfonic acid was formed (step S3B in FIG. 4).

Succeedingly, the pellet 2 formed with the first layer 41 composed of polypyrrole, was immersed into a methanol solution of 4% 3,4-ethylendioxy-thiophene/12% iron (III) benzenedisulfonate, cooled at the temperature of 0° C. Then, the pellet 2 was taken out from the solution and was left at room temperature for 30 minutes. Thereafter, the pellet 2 was washed by methanol for 15 minutes, and then, left at room temperature for 30 minutes. Thus, a layer of poly(3, 4-ethylendioxy-thiophene) was formed.

The above mentioned operation was repeated four times, so that, as shown in FIG. 3, a second conducting polymer layer 42 composed of poly(3,4-ethylendioxy-thiophene) doped with benzenedisulfonic acid was formed (step S3C in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 6 was finished.

Embodiment 7

A pellet 2 formed with the tantalum oxide film 3 similarly to Embodiment 1 was immersed into a methanol solution of 3% copper (II) dodecylbenzensulfonate at room temperature. Then, the pellet was taken out from the solution, and it was left at room temperature for 30 minutes. Thereafter, the pellet 2 was immersed into 3,4-ethylendioxy-thiophene solution. Furthermore, the pellet was taken out from the solution and left at room temperature for 30 minutes. Then, the pellet 2 was washed by methanol for 5 minutes, and then, dried at a temperature of 150° C. for 30 minutes. Thus, a layer of poly(3,4-ethylendioxy-thiophene) was formed.

The above mentioned operation was repeated six times, so that a conducting polymer layer 4 composed of poly(3,4-ethylendioxy-thiophene) doped with dodecylbenzensulfonic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 7 was finished.

Embodiment 8

A pellet 2 formed with the tantalum oxide film 3 similarly to Embodiment 1 was immersed into a benzonitrile solution of 10% silver (II) oxide (argentic oxide) at room temperature. Then, the pellet was taken out from the solution, and it was left at room temperature for 30 minutes. Thereafter, the pellet 2 was immersed into 3,4-ethylendioxy-thiophene solution. The pellet 2 was taken out from the solution, and was left at room temperature for 30 minutes. Then, the pellet 2 was washed by methanol for 5 minutes, and then, dried at a temperature of 150° C. for 30 minutes. Thus, a layer of poly(3,4-ethylendioxy-thiophene) was formed. Furthermore, the pellet 2 was immersed into a 10% toluensulfonic acid solution for 30 minutes, for the purpose of the doping.

The above mentioned operation was repeated six times, so that a conducting polymer layer 4 composed of poly(3,4-ethylendioxy-thiophene) doped with toluensulfonic acid was formed (step S3A in FIG.4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 8 was finished.

Embodiment 9

A pellet 2 formed with the tantalum oxide film 3 similarly to Embodiment 1 was immersed into a solution of 3,4-ethylendioxy-thiophene. Thereafter, the pellet 2 was taken out from the solution, and it was left at room temperature for 30 minutes. The pellet 2 was immersed into a 3% iron nitrate/30% hydrogen peroxide water. The pellet 2 was taken out from the solution, and it was left at room temperature for 30 minutes. Then, the pellet 2 was washed by a mixed solvent of 50% methanol and 50% water for 5 minutes, and then, dried at a temperature of 150° C. for 30 minutes. Thus, a layer of poly(3,4-ethylendioxy-thiophene) was formed. Furthermore, the pellet 2 was immersed into a 10% toluensulfonic acid solution for 30 minutes, for the purpose of the doping.

The above mentioned operation was repeated six times, so that a conducting polymer layer 4 composed of poly(3,4-ethylendioxy-thiophene) doped with toluensulfonic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 8 was finished.

Comparative Example 1

A pellet 2 formed with the tantalum oxide film 3 similarly to Embodiment 1 was immersed into a 50% butanol/50% methanol solution of 2% 3,4-ethylendioxy-thiophene/12% iron (III) toluensulfonate, cooled at the temperature of 0° C. Then, the pellet 2 was taken out from the solution and was left at room temperature for 30 minutes. Thereafter, the pellet 2 was washed by methanol for 15 minutes, and then, dried at a temperature of 150° C. for 30 minutes. Thus, a layer of poly(3,4-ethylendioxy-thiophene) was formed.

The above mentioned operation was repeated ten times, so that a conducting polymer layer 4 composed of poly(3, 4-ethylendioxy-thiophene) doped with toluensulfonic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Comparative Example 1 was finished.

Comparative Example 2

Similarly to the Embodiment 6, as shown in FIG. 3, a conducting polymer layer 41 composed of polypyrrole doped with benzene disulfonic acid was formed on the surface of the pellet 2 formed with the tantalum oxide film 3 similarly to Embodiment 1. Thereafter, differently from the Embodiment 6, a second conducting polymer layer 42 composed of poly(3,4-ethylendioxy-thiophene) was not formed, and the cathode conductor layer forming step (step S4), the external terminal mounting step (step S5) and the encapsulating and housing step (step S6) were performed. Thus, the chip type tantalum solid electrolyte capacitor of this Comparative Example 2 was finished.

Comparative Example 3

A pellet 2 formed with the tantalum oxide film 3 similarly to Embodiment 1 was immersed into a methanol solution of 30% iron (III) dodecylbenzensulfonate at room temperature. Then, the pellet was taken out from the solution, and it was left at room temperature for 30 minutes. Thereafter, the pellet 2 was immersed into 3,4-ethylendioxy-thiophene solution. Furthermore, the pellet was taken out from the solution and left at room temperature for 30 minutes. Then, the pellet 2 was washed by methanol for 5 minutes, and then, dried at a temperature of 150° C. for 30 minutes. Thus, a layer of poly(3,4-ethylendioxy-thiophene) was formed.

The above mentioned operation was repeated ten times, so that a conducting polymer layer 4 composed of poly(3,4-ethylendioxy-thiophene) doped with dodecylbenzensulfonic acid was formed (step S3A in FIG. 4).

Thereafter, similarly to the Embodiment 1, the cathode conductor layer forming step (step S4), the external terminal mounting step (step S5) and the encapsulating and housing step (step S6) were performed. Thus, the chip type tantalum solid electrolyte capacitor of this Embodiment 7 was finished.

TABLE 1

| capacitor | capacitance ($\mu$F) | ESR ($\Omega$) before test | ESR ($\Omega$) after test | ESR increase ratio |
|---|---|---|---|---|
| embodiment 1 | 10.3 | 0.15 | 0.17 | 1.13 |
| embodiment 2 | 10.4 | 0.17 | 0.18 | 1.06 |
| embodiment 3 | 10.2 | 0.13 | 0.15 | 1.15 |
| embodiment 4 | 10.3 | 0.15 | 0.15 | 1.00 |
| embodiment 5 | 10.5 | 0.18 | 0.17 | 0.94 |
| comparative example 1 | 9.5 | 0.20 | 0.53 | 2.65 |

$$\text{ESR increase ratio} = \frac{\text{(ESR after test)}}{\text{(ESR before test)}}$$

The above TABLE 1 shows the result of the high temperature test at the temperature of 125° C. of the capacitors obtained in the Embodiments 1 to 5 and the Comparative Example 1. As seen from TABLE 1, it could be seen that, before the high temperature test, the Comparative Example 1 has the capacitance and the ESR comparable to those of the Embodiments 1 to 5. However, After the high temperature test, the ESR of the Comparative Example 1 remarkably increased. The Embodiments 1 to 5 have the ESR increase ratio in the range of only 0.94 to 1.15, but the Comparative Example 1 has the ESR increase ratio of 2.65. The reason for this is considered that, the toluensulfonic acid was used as the dopant in the Comparative Example 1, but in the Embodiments 1 to 5, as the dopant, there was used the organic sulfonic acid having a molecular size larger than that of the toluensulfonic acid.

TABLE 2

| capacitor | polymer layer film thickness ($\mu$m) | capacitance ($\mu$F) | ESR ($\Omega$) before test | ESR ($\Omega$) after test | leak current before test | leak current after test |
|---|---|---|---|---|---|---|
| embodiment 6 | 15 | 10.6 | 0.15 | 0.16 | 24 | 25 |
| comparative example 2 | 3 | 10.5 | 0.28 | 0.37 | 28 | 237 |

The above TABLE 2 shows the result of the heat shock test (between −55° C. and +125° C., 100 repetitions) of the capacitors obtained in the Embodiment 6 and the Comparative Example 2, by means of the ESR and the leak current at 100 KHz before and after the text. As seen from TABLE 2, before the heat shock test, the Comparative Example 2 showed the electrostatic capacitance and the leak current comparable to the Embodiment 6, but the ESR is about 1.9 times of that of the Embodiment 6. After the heat shock test, in the Embodiment 6, the ESR and the leak current did not substantially change, but in the Comparative Example 2, both the ESR and the leak current greatly increased. In particular, the leak current remarkably increased to about 8.5 times. The reason for this is considered that, in the Comparative Example 2, the conducting polymer layer is formed of only the single layer of polypyrrole. Namely, as mentioned hereinbefore, since polypyrrole has the nature formed in the form of powder, the film quality is poor in denseness. Therefore, in order to cause the capacitor to have a sufficient "resistance to thermal stress", it is necessary to form the polypyrrole film having a sufficient thickness, with the result that the ESR inevitably increases. On the other hand, in order to suppress the ESR at a small value by considering a high frequency characteristics of the capacitor, the polypyrrole film must be made as thin as 3 $\mu$m as shown in TABLE 2, with the result that the "resistance to thermal stress" inevitably drops. On the other hand, the conducting polymer layer of the Embodiment 6 has a double-layer structure having the poly(3,4-ethylendioxy-thiophene) layer formed on the polypyrrole film layer. Since the poly(3,4-ethylendioxy-thiophene) has a dense film quality, although the poly(3,4-ethylendioxy-thiophene) layer is formed to have a thickness enough to have a satisfactory "resistance to thermal stress", the ESR can be maintained at a small value. The result of TABLE 2 shows an advantage of elevating the "resistance to thermal stress" by use of poly(3,4-ethylendioxy-thiophene).

TABLE 3

| capacitor | repetitive number of processing | capacitance ($\mu$F) | by-product substance | by-product amount (molar ratio) |
|---|---|---|---|---|
| embodiment 7 | 6 | 10.5 | copper (II) dodecylbenzen-sulfonate | 5.5 |
|  |  |  | dodecylbenzen-sulfonic acid | 4.6 |
| embodiment 8 | 6 | 10.6 | silver (I) oxide (argentous oxide) | 0.8 |

TABLE 3-continued

| | repetitive | | by-product | |
|---|---|---|---|---|
| capacitor | number of processing | capacitance ($\mu$F) | substance | amount (molar ratio) |
| embodiment 9 | 6 | 10.3 | no (only water) | 0 |
| comparative example 3 | 10 | 9.5 | iron (II) dodecyl-benzensulfonate | 9.9 |
| | | | dodecylbenzen-sulfonic acid | 4.6 |

TABLE 3 shows the repetitive number of processing of the oxidizing agent solution immersion to the monomer solution immersion (or the monomer solution immersion to the oxidizing agent solution immersion) for the purpose of forming the conducting polymer layer, the electrostatic capacitance of the capacitor, and the generation amount of the by-product (other than the target polymer) in the Embodiments 7 to 9 and the Comparative Example 3.

It would be noted from TABLE 3 that, in order to obtain substantially the same capacitance, it is sufficient in the Embodiments 7 to 9 if the processing is repeated six times, but in the Comparative Example 3, it is necessary to repeat the processing ten times. In the Embodiments 7 to 9, the amount of generated by-products is 10.1 (in molar ratio) (Embodiment 7) at maximum, and is zero in some case (in Embodiment 9) In the Comparative Example 3, on the other hand, the amount of generated by-products reaches 14.5, and is too much. The reason for this is considered that the Comparative Example 3 utilizes the oxidation reaction of iron (III) (ferric ion) to iron (II) (ferrous ion).

Namely, the reaction in the Comparative Example 3 can be expressed as follows: In the following, EDT indicates 3,4-ethylendioxy-thiophene, and PEDT indicates poly(3,4-ethylendioxy-thiophene). And, TsO shows dodecylbenzen-sulfonic acid.

On the other hand, the following is the reaction in the Embodiment 7 using copper(II) as the oxidizing agent:

Here, paying attention to the oxidizing agent after reaction, the number of "TsO" in the Embodiment 7 becomes less than that in the Comparative Example 3 by one. Namely, the amount of generated by-product is reduced. This is also true in the Embodiment 8 using the silver (II) (argentic ion).

Furthermore, in the Embodiment 9 using the mixture of the hydrogen peroxide water and the iron compound as the oxidizing agent, the by-product becomes liquid, and the amount of the solid by-product becomes zero, as follows:

Thus, the amount of generation of by-product can be remarkably reduced, and therefore, the polymerization efficiency can be improved.

As mentioned above, the solid electrolyte capacitor in accordance with the present invention is characterized in that the conducting polymer layer constituting the solid electrolyte is doped with the dopant of a large molecular size, selected from the group consisting of aromatic polysulfonic acid, organic sulfonic acid having hydroxy group, organic sulfonic acid having carboxyl group, alicyclic sulfonic acid and benzoquinone sulfonic acid. This feature prevents deterioration of the ESR when the capacitor is exposed to a high temperature atmosphere in an actual use environment, and therefore, can elevate the reliability of the capacitor ("resistance to high temperature").

Additionally, the solid electrolyte capacitor in accordance with the present invention is characterized in that the outermost layer of the solid electrolyte layer is constituted of the polymer of the polythiophene derivative having a dense film quality. This can prevent the increase of the leak current and the deterioration of the ESR, which are attributable to the stress caused by the thermal expansion and shrinkage of the encapsulating resin.

Furthermore, the method in accordance with the present invention for manufacturing the solid electrolyte capacitor is characterized by using the oxidizing agent producing only the reduced amount of by-product, other than the iron (III). This elevates the polymerization efficiency at the time of forming the conducting polymer layer constituting the solid electrolyte, and therefore, can shorten the time of the manufacturing process and therefore the manufacturing cost.

The invention has thus been shown and described with reference to the specific embodiments. However, it should be noted that the present invention is in no way limited to the details of the illustrated structures but changes and modifications may be made within the scope of the appended claims.

What is claimed is:

1. A solid electrolyte capacitor comprising a solid electrolyte layer formed of a polymeric product layer comprising a polythiophene or polythiophene derivative or comprising at least one layer formed of a polymer or copolymer of at least one monomer selected from the group consisting of pyrrole, thiophene, furan, aniline and their derivatives and an outermost layer formed of polythiophene or polythiophene derivative, wherein said polymeric product layer is doped with an organic sulfonic acid selected from the group consisting of aromatic polysulfonic acid including a plurality of sulfonic groups and having a three-dimensional molecular size larger than that of p-toluenesulfonic acid, organic sulfonic acid having a hydroxy group, organic sulfonic acid having a carboxyl group alicyclic sulfonic acid and benzoquinone sulfonic acid.

2. A solid electrolyte capacitor claimed in claim 1, wherein said solid electrolyte layer comprises said polythiophene derivative, and the polythiophene derivative is poly(3,4-ethylendioxy-thiophene).

3. A solid electrolyte comprising a solid electrolyte layer formed of a polymeric product layer comprising a polythiophene of polythiophene derivative or comprising at least one layer formed of a polymer or copolymer of at least one monomer selected from the group consisting of pyrrole, thiophene, furan, aniline, and their derivatives and an outermost layer formed of polythiophene or polythiophene derivative, wherein said polymeric product layer is doped with an organic sulfonic acid selected from the group consisting of aromatic polysulfonic acid, organic sulfonic acid having a hydroxy group, organic sulfonic acid having a carboxyl group, alicyclic sulfonic acid, and benzoquinone sulfonic acid, said solid electrolyte layer comprises said polythiophene derivative, and the polythiophene derivative is poly(3,4-ethylendioxy-thiophene).

4. A solid electrolyte capacitor comprising a solid electrolyte layer formed of a polymeric product layer comprising at least an outermost layer portion formed of polythiophene derivative, wherein said polymeric product layer is doped with an aromatic polysulfonic acid including a plurality of sulfonic groups and having a three-dimensional molecular size larger than that of p-toluenesulfonic acid.

5. A solid electrolyte capacitor as claimed in claim 4, wherein said polythiophene derivative is poly(3,4-ethylenedioxy-thiophene).

6. A solid electrolyte capacitor as claimed in claim 5, wherein said polymeric product layer comprises at least one layer formed of a polymer or copolymer of at least one monomer selected from the group consisting of pyrrole, thiophene, furan, aniline and their derivatives, said at least one layer being coated with said outermost layer portion formed of polythiophene derivative.

7. A solid electrolyte capacitor comprising a solid electrolyte layer formed of a polymeric product layer comprising at least an outermost layer portion formed of polythiophene derivative, wherein said polymeric product layer is doped with an organic sulfonic acid selected from the group consisting of organic sulfonic acid having a hydroxy group, organic sulfonic acid having a carboxyl group, alicyclic sulfonic acid and benzoquinone sulfonic acid.

8. A solid electrolyte capacitor as claimed in claim 7, wherein said polythiophene derivative is poly(3,4-ethylendioxy-thiophene).

9. A solid electrolyte capacitor as claimed in claim 8, wherein said polymeric product layer comprises at least one layer formed of a polymer or copolymer of at least one monomer selected from the group consisting of pyrrole, thiophene, furan, aniline and their derivatives, said at least one layer being coated with said outermost layer portion formed of polythiophene derivative.

10. A solid electrolyte capacitor comprising a solid electrolyte layer formed of a polymeric product layer comprising at least two layers, wherein an outermost layer portion is formed of a polythiophene derivative, wherein said polymeric product layer is doped with an organic sulfonic acid selected from the group consisting of organic sulfonic acid having a hydroxy group, organic sulfonic acid having a carboxyl group, alicyclic sulfonic acid and benzoquinone sulfonic acid.

* * * * *